United States Patent
Kobayashi

(10) Patent No.: US 9,446,794 B2
(45) Date of Patent: Sep. 20, 2016

(54) FENDER PANEL SUPPORT STRUCTURE FOR VEHICLE

(71) Applicant: TOYODA IRON WORKS CO., LTD., Toyota-shi, Aichi (JP)

(72) Inventor: Hideyuki Kobayashi, Toyota (JP)

(73) Assignee: TOYODA IRON WORKS CO., LTD., Toyota-shi (JP)

( * ) Notice: Subject to any disclaimer, the term of this patent is extended or adjusted under 35 U.S.C. 154(b) by 0 days.

(21) Appl. No.: 14/906,201

(22) PCT Filed: Apr. 1, 2014

(86) PCT No.: PCT/JP2014/059683
§ 371 (c)(1),
(2) Date: Jan. 19, 2016

(87) PCT Pub. No.: WO2015/008511
PCT Pub. Date: Jan. 22, 2015

(65) Prior Publication Data
US 2016/0159398 A1 Jun. 9, 2016

(30) Foreign Application Priority Data
Jul. 18, 2013 (JP) .................. 2013-149810

(51) Int. Cl.
| | |
|---|---|
| B62D 21/00 | (2006.01) |
| B62D 21/15 | (2006.01) |
| B62D 25/16 | (2006.01) |
| B62D 24/00 | (2006.01) |
| B60R 21/34 | (2011.01) |

(52) U.S. Cl.
CPC .............. *B62D 21/15* (2013.01); *B62D 24/00* (2013.01); *B62D 25/163* (2013.01); *B60R 2021/343* (2013.01)

(58) Field of Classification Search
CPC ..... B62D 21/15; B62D 25/163; B62D 24/00
USPC ......................................................... 296/198
See application file for complete search history.

(56) References Cited

U.S. PATENT DOCUMENTS

| | | | |
|---|---|---|---|
| 7,413,239 B2* | 8/2008 | Mitsuyama | B62D 25/163 296/187.04 |
| 2002/0060474 A1 | 5/2002 | Chung | |
| 2010/0314518 A1* | 12/2010 | Steinhilb | B62D 25/163 248/274.1 |

FOREIGN PATENT DOCUMENTS

| | | |
|---|---|---|
| JP | 2002-166854 A | 6/2002 |
| JP | 2005-329874 A | 12/2005 |

(Continued)

OTHER PUBLICATIONS

Jul. 15, 2014 International Search Report issued in International Patent Application No. PCT/JP2014/059683.

(Continued)

*Primary Examiner* — Joseph D Pape
(74) *Attorney, Agent, or Firm* — Oliff PLC

(57) ABSTRACT

First bracket including first upper wall wherein first leg extending downward from, first flange extending from lower end of first leg; second bracket including second upper wall overlapped on first upper wall, second leg extending downward from second upper wall, and second flange extending from lower end of second leg. First and second flanges are fixed to vehicle body member, and upper portion of fender panel is connected to second upper wall. Second leg includes structure that deforms when impact load is input from fender panel to second upper wall to cause second upper wall together with fender panel to be displaced horizontally. Fender panel support structure includes connector coupling first and second upper walls together with certain clamping force that when certain impact load is input from fender panel to second upper wall, second upper wall is displaced against clamping force until it is separated from first upper wall.

7 Claims, 5 Drawing Sheets

(56) References Cited

FOREIGN PATENT DOCUMENTS

| | | |
|---|---|---|
| JP | 2006-232085 A | 9/2006 |
| JP | 2009-190565 A | 8/2009 |
| JP | 2013-112049 A | 6/2013 |

OTHER PUBLICATIONS

Jul. 15, 2014 Written Opinion issued in International Patent Application No. PCT/JP2014/059683.

* cited by examiner (a) Before deformation (b) After deformation (a) Before deformation (b) After deformation

FENDER PANEL SUPPORT STRUCTURE FOR VEHICLE

FIELD OF THE INVENTION

The present invention relates to a fender panel support structure for a vehicle, and in particular to a technique that appropriately allows desired impact absorption when an impact load is applied to a fender panel while securing the rigidity for supporting the fender panel.

RELATED ART

There has been known a fender panel support structure in a vehicle including an impact absorption bracket that includes an upper wall, a plurality of legs, and a plurality of flanges extending from the lower end of the plurality of legs. The bracket is fixed to a vehicle body member via the plurality of flanges and An upper portion of a fender panel is attached to the upper wall so that an impact load applied to the fender panel is absorbed through deformation of the plurality of legs. JP 2009-190565 A describes an example of such a support structure, in which the impact absorption bracket is constituted of a single part.

Among such fender panel support structures for a vehicle, there is also a proposed structure that includes: (a) a first bracket that includes a first upper wall, a first leg extending downward continuously from the first upper wall, and a first flange extending from the lower end of the first leg; and (b) a second bracket that includes a second upper wall overlapped on the first upper wall, a second leg extending downward continuously from the second upper wall, and a second flange extending from the lower end of the second leg, (c) the first flange and the second flange being fixed to a vehicle body member, and an upper portion of a fender panel being attached to the first and second upper walls which are overlapped each other (see JP 2006-232085).

SUMMARY OF THE INVENTION

In the art described in JP 2009-190454 A, however, the impact absorption bracket comprises a single part, making it difficult to maintain both the rigidity for supporting the fender panel and the absorption of impact load. In the art described in JP 2006-232085, on the other hand, the first and second upper walls are overlapped each other and connected together, thereby producing a high support rigidity in normal conditions. When an impact load is applied, the second upper wall is lowered to be separated from the first upper wall, which reduces the rigidity for supporting the fender panel to obtain good impact absorption. In JP 2006-232085, however, the second upper wall is pushed downward by a hood to be separated from the first upper wall. Therefore, when the impact is applied only to the fender panel, or depending on the mode of deformation of the hood, the second upper wall may not be separated from the first upper wall, resulting in a failure to appropriately provide the desired impact absorption.

There is a need in the art for reliably providing a desired impact absorption when an impact load is applied to a fender panel while securing the rigidity for supporting the fender panel.

An aspect of the invention provides a fender panel support structure for a vehicle, including: (a) a first bracket including a first upper wall, a first leg extending downward continuously from the first upper wall, and a first flange extending from a lower end of the first leg; and (b) a second bracket including a second upper wall overlapped on the first upper wall, a second leg extending downward continuously from the second upper wall, and a second flange extending from a lower end of the second leg, (c) the first flange and the second flange being fixed to a vehicle body member, and an upper portion of a fender panel being attached to the overlapped first and second upper walls. The fender panel support structure is characterized in that: (d) the second bracket is fixed to the vehicle body member in an attitude in which the second leg intersects a vehicle width, the second upper wall extends away from the vehicle width center and is overlapped on the first upper wall, and the fender panel is fixedly attached to the second upper wall; (e) the second leg includes a deformable structure allowing the second upper wall together with the fender panel to be displaced toward the vehicle width center when an impact load is input from the fender panel to the second upper wall; and (f) the fender panel support structure includes a connector coupling the first and second upper walls together with a certain clamping force such that when a certain impact load is input from the fender panel to the second upper wall, the second upper wall is displaced against the clamping force toward the vehicle width center and separated from the first upper wall.

In some embodiments, both the first and second upper walls are shaped in a flat plate and inclined downward as they near a vehicle width center so that the second upper wall is slid on the inclined first upper wall.

In some embodiments, (a) the first upper wall defines a notch extending from its edge on the near side from the vehicle width center, and the second upper wall and the fender panel each define a connector hole; and (b) the connector comprises a bolt inserted through the notch and the connector holes, and a nut screwed onto the bolt, the bolt and nut being tightened each other to couple the first and second upper walls together with a certain clamping force and fixedly attach the fender panel to the second upper wall, and the notch allowing the second upper wall to be separated from the first upper wall until it is displaced toward the vehicle width center.

In some embodiments, the upper portion of the fender panel includes an attachment edge attached to the second upper wall, and a rising section extending obliquely upward from the attachment edge as it separates away from the vehicle width center so that the attachment edge receives a force directed toward the vehicle width center when a downward impact load is input to the rising section.

In some embodiments, a deformable structure in the second leg is a bend located in a middle of the height such that the second leg is slanting toward the vehicle width center as it nears the top.

In some embodiments, the first and second upper walls are overlapped each other and connected together by the connector. The first and second brackets together provide a high support rigidity in normal conditions. When a certain impact load is applied, on the other hand, the second upper wall is separated from the first upper wall, overcoming the clamping force of the connector. Therefore, the support rigidity is reduced with the fender panel supported by only the second bracket, and good impact absorption can be obtained corresponding to the deformation of the second bracket. In particular, the second bracket is fixed to a vehicle body member in such an attitude that the second leg intersects the vehicle width, and the second upper wall extends away from the vehicle width center and is overlapped on the first upper wall. When an impact load is input from the fender panel to the second upper wall, the second upper wall together with the fender panel is displaced toward the vehicle width center until it is separated from the first upper wall. This assuredly provides a desired impact absorption when an impact load is applied to the fender panel, in any situation whether the hood is deformed or not.

In some embodiments, both the first and second upper walls are shaped in a flat plate, and are inclined downward as they near the vehicle width center. Therefore, when an impact load is input from the fender panel to the second upper wall, the second upper wall is smoothly slid on the inclination of the first upper wall toward the vehicle width center. This assuredly provides a desired impact absorption. In addition, the attachment edge of the fender panel is lowered as well as traveling toward the vehicle width center. This increases the deformation (or vertical displacement of collapse) of the fender panel itself to provide a better impact absorption.

In some embodiments, the first upper wall defines the notch, the second upper wall and the fender panel define the connector holes, and the connector comprises the bolt inserted through the notch and the connector holes, and the nut screwed onto the bolt. When the bolt and nut are tightened each other with the fender panel and the first and second upper walls interposed between the bolt and nut, the first and second upper walls are coupled together with a certain clamping force to support the fender panel with desired support rigidity. In addition, when a certain impact load is input from the fender panel to the second upper wall via the bolt, the second upper wall together with the fender panel is displaced against the clamping force toward the vehicle width center with respect to the first upper wall, with the bolt traveling in the notch, to provide the desired impact absorption. In this case, the clamping force can be easily adjusted by changing the tightening force of the bolt and nut, and thereby the support rigidity, which corresponds to the clamping force, can be adjusted conveniently.

In some embodiments, the rising section extends continuously from the attachment edge of the fender panel. When a downward impact load is input to the rising section, the attachment edge is subjected to a stress directed toward the vehicle width center. Therefore, the second upper wall to which the attachment edge is attached is smoothly displaced toward the vehicle width center, which assuredly allows for a desired impact absorption. In addition, the rising section is deformed such as to increase the opening angle of the upper portion of the fender panel which increases the deformation of the fender panel itself, resulting in a better impact absorption.

In some embodiments, the second leg includes as a deformable structure the bend such that the second leg slanting toward the vehicle width center as it nears the top. The deformation of the second leg allows the second upper wall, where the fender panel is attached, to smoothly travel toward the vehicle width center, which assures a desired impact absorption. In addition, the impact absorption by the deformation of the second leg can be adjusted in accordance with the position or the bend angle of the bend.

DETAILED DESCRIPTION OF THE INVENTION

Figure 1:
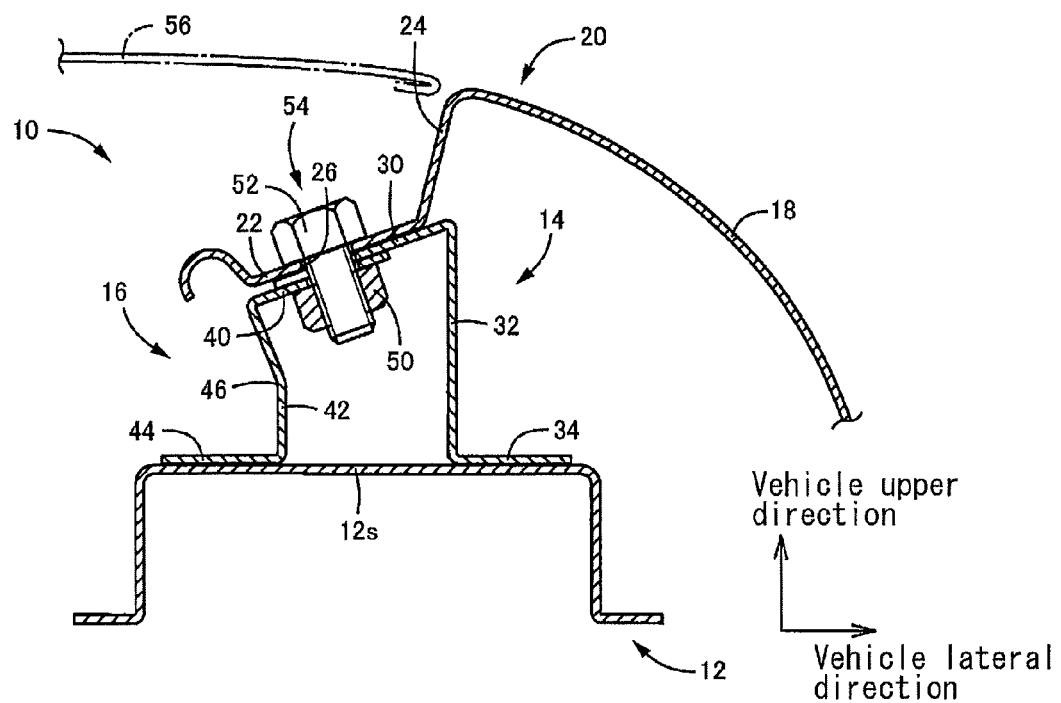
FIG. 1 is a vertical sectional view of a fender panel support structure for a vehicle according to an embodiment of the present invention.

Examples of the vehicle body member to which the first and second flanges of the respective first and second brackets are fixed include an upper member of a radiator support or a body panel. The first and second flanges are integrally fixed to the vehicle body member, for example, by a welding process such as arc welding and spot welding. However, other fixing means such as screwing may also be employed.

The deformable structure configured into the second leg of the second bracket allows for deformation of the second leg such that when a certain impact load is input from the fender panel to the second upper wall, the second upper wall is displaced toward the vehicle width center to be separated from the first upper wall to provide a desired impact absorption. A bend such that the second leg is slanting toward the vehicle width center as it nears the top, for example, is preferably used as the deformable structure. As an alternative to or in addition to the bend, a variety of implementations are possible, such as a groove with a V-shaped section that extends in the vehicle length, a notch in a side edge of the second leg in the vehicle length direction, a punched hole or slit (i.e. elongated through hole) in the second leg, a second bracket with a thickness smaller than that of the first bracket, or an appropriate combination thereof.

The second leg of the second bracket is disposed in such an attitude that the second leg intersects the vehicle width. This is for the purpose of allowing the second upper wall to be easily displaced toward the vehicle width center when an impact load is applied to the fender panel. The second leg is desirably oriented to extend generally in parallel with the vehicle length, for example. However, it is not always necessary that the second leg should extend exactly in parallel with the vehicle length, and the second leg may be inclined to right or left.

It is suitable that the overlapped first and second upper walls of the first and second brackets, respectively, are shaped in a flat plate that extends generally horizontally or is inclined downward as it nears the vehicle width center. The connector, which couples such a first upper wall and a second upper wall together with a certain clamping force (coupling strength), is suitably implemented by a bolt inserted through the notch defined in the first upper wall and a nut screwed onto the bolt, for example. However, the first and second upper walls may be coupled together using a coupling pin that is ruptured upon application of a certain impact load, or welded, bonded, or otherwise coupled together. The second upper wall and the fender panel are conveniently coupled together by the same bolt and nut that couple the first and second upper walls together. However, the second upper wall and the fender panel can be coupled together using another pair of bolt and nut separately from the one that couples the first and second upper walls. The second upper wall and the fender panel can also be welded, bonded or otherwise fixedly coupled together.

Regarding the first and second upper walls, the second upper wall is overlapped on the lower side of the first upper wall, for example. However, the second upper wall may be overlapped on the upper side of the first upper wall. The first upper wall extends toward the vehicle width center and is overlapped on the second upper wall, for example. The first and second brackets are configured such that the first and second upper walls are coupled together to form a generally hat-shaped cross section as a whole. However, the direction of the first and second flanges is determined as appropriate. The first bracket may include two or more first legs to provide the desired support rigidity.

When a certain impact load is applied from the fender panel to the second upper wall, the second upper wall is displaced toward the vehicle width center and then separated from the first upper wall. In this process the second bracket or the fender panel is deformed to provide desired impact absorption. It is not always necessary that the first bracket should be deformed. However, the first bracket may be deformed along with deformation of the second bracket or deformation of the fender panel.

In a particular embodiment, the upper portion of the fender panel includes a rising section which extends obliquely upward from the attachment edge as it separates away from the vehicle width center. In alternative embodiments, a variety of forms such as a rising section extending upward and generally perpendicularly from the attachment edge can be used.

Figure 2:
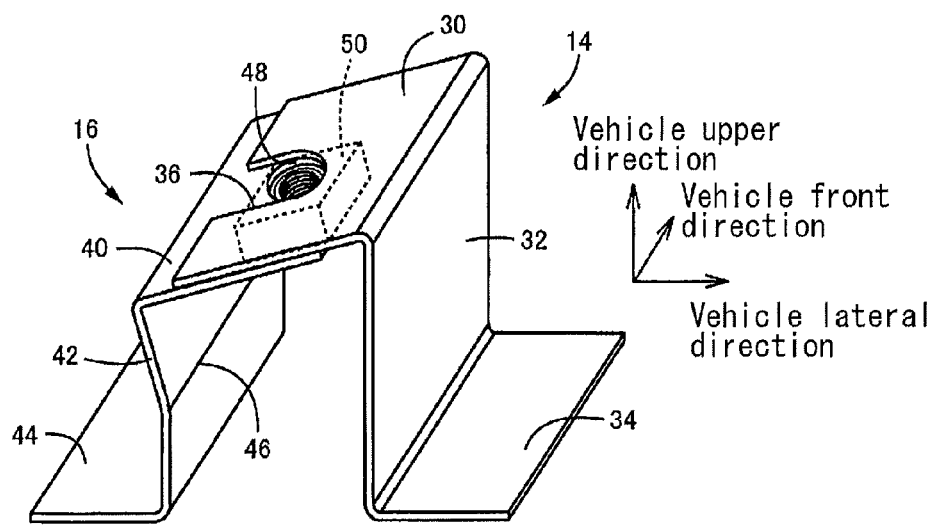
FIG. 2 is a perspective view of a pair of brackets that constitute a main portion of the fender panel support structure of FIG. 1.

Further embodiments of the present invention will be described in detail below with reference to the drawings. FIG. 1 is a vertical sectional view of a fender panel support structure 10 for a vehicle according to an embodiment of the present invention. A pair of a first bracket 14 and a second bracket 16 are welded or otherwise integrally fixed to an upper member 12 of a radiator support or a body panel which is a vehicle body member. FIG. 2 is a perspective view illustrating the first bracket 14 and the second bracket 16 alone, being disposed on the upper member 12. A plurality of pairs of the first bracket 14 and second bracket 16 thus configured are arranged at certain intervals along the vehicle length to support an upper portion 20 of the front fender panels 18 at a plurality of locations. A hood 56 is openably disposed between upper portions 20 of the right and left fender panels 18 to cover an engine compartment including the fender panel support structure 10.

The first bracket 14 is located on the far side from the vehicle width center, and constituted of a metal plate material bent in a crank shape. The first bracket 14 includes a first upper wall 30, a first leg 32 extending downward continuously from the first upper wall 30, and a first flange 34 extending from the lower end of the first leg 32. The first bracket 14 is fixed to the upper member 12 on the first flange 34 in such an attitude that the first leg 32 extends generally vertically and generally in parallel with the vehicle length. The first flange 34 is formed by bending the first bracket 14 generally at a right angle such that the first flange 34 extends away from the vehicle width center. The first upper wall 30 is formed by bending the first bracket 14 such that the first upper wall 30 projects toward the vehicle width center. A U-shaped notch 36 is cut in the first upper wall 30, at a central portion in the vehicle length, extending from the edge on the far side from the vehicle width center. The upper member 12 is an elongated member extending along the vehicle length and having a hat-shaped cross section. The first flange 34 is laid on a generally horizontal raised flat portion 12s of the hat-shaped cross section so as to be in substantially close contact with the raised flat portion 12s, and is welded or otherwise integrally fixed to the raised flat portion 12s.

The second bracket 16 is located on the near side from the vehicle width center, and constituted of a metal plate material bent in a crank shape. The second bracket 16 includes a second upper wall 40, a second leg 42 extending downward continuously from the second upper wall 40, and a second flange 44 extending from the lower end of the second leg 42. The second bracket 16 is fixed to the upper member 12 on the second flange 44 in such an attitude that the second leg 42 extends generally vertically and generally in parallel with the vehicle length. The second flange 44 is formed by bending the second bracket 16 generally orthogonally such that the second flange 44 extends toward the vehicle width center. The second upper wall 40 is formed by bending the second bracket 16 such that the second upper wall 40 projects away from the vehicle width center. The second flange 44 is laid on the raised flat portion 12s of the upper member 12 so as to be in substantially close contact with the raised flat portion 12s, and is welded or otherwise integrally fixed to the raised flat portion 12s. A bend 46 is located at an intermediate position of the height of the second leg 42. The bend 46 is such that the second leg 42 is slanting toward the vehicle width center as it nears the top. This allows the second upper wall 40 to be easily displaced toward the vehicle width center. The bend 46 serves as a deformable structure that allows the second upper wall 40 to be displaced toward the vehicle width center when an impact load is input from the fender panel 18 to the second upper wall 40.

The second upper wall 40 is overlapped on the lower side of the first upper wall 30, in substantially close contact with the first upper wall 30, and includes a connector hole 48 at the central portion corresponding to the notch 36. A nut 50 is welded or otherwise integrated into the lower surface of the second upper wall 40, generally concentrically with the connector hole 48. When a bolt 52 is downwardly screwed through the notch 36 and connector hole 48 into the nut 50 and then tightened up, the first upper wall 30 and second upper wall 40 are coupled together with a certain clamping force. When coupled, the first bracket 14 and the second bracket 16 form a generally hat-shaped cross section, integrally fixed to the upper member 12, to support the fender panel 18 with a desired support rigidity. The upper portion 20 of the fender panel 18 includes an attachment edge 22 that is laid on the upper surface of the first upper wall 30 in substantially close contact therewith. The upper portion 20 of the fender panel 18 also includes a rising section 24 that extends obliquely upward from the attachment edge 22 as it separates away from the vehicle width center. The bolt 52 is inserted through a connector hole 26 formed in the attachment edge 22 so that the fender panel 18 is integrally attached to the second upper wall 40 via the bolt 52.

Being interposed between the fender panel 18 and the second upper wall 40, the first upper wall 30 is clamped with the tightening force (or torque) of the bolt 52 and nut 50 and fixedly coupled by friction to the second upper wall 40.

Figure 3:
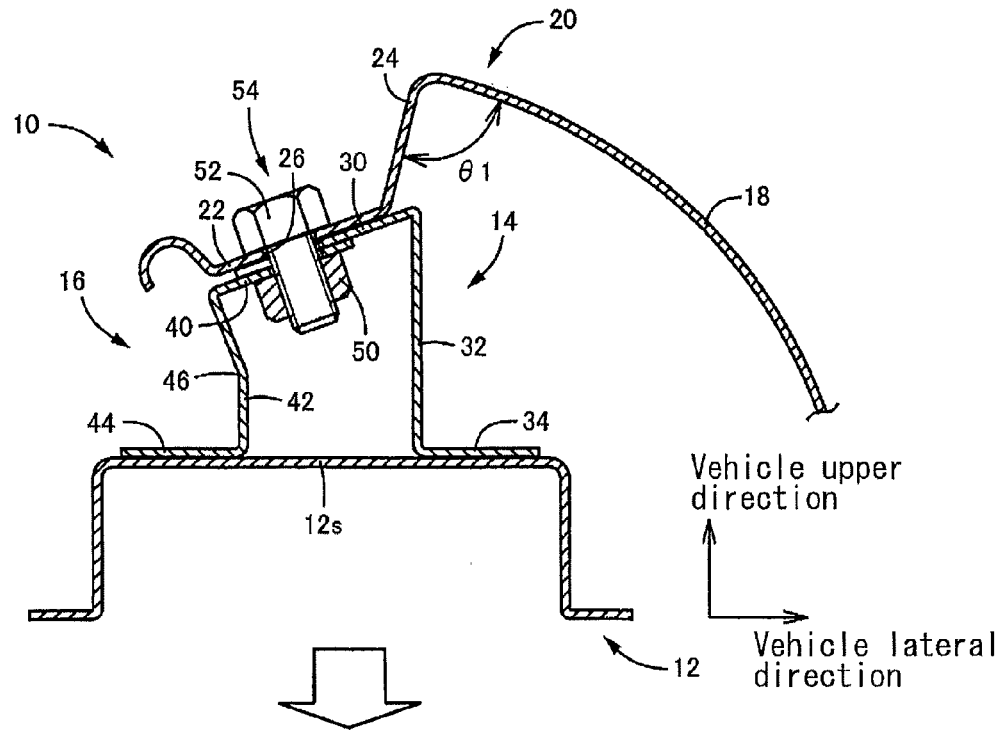
FIG. 3 illustrates operation that occurs when an impact load F is input to the fender panel support structure of FIG. 1, FIG. 3 being a vertical sectional view corresponding to FIG. 1.
Figure 3:
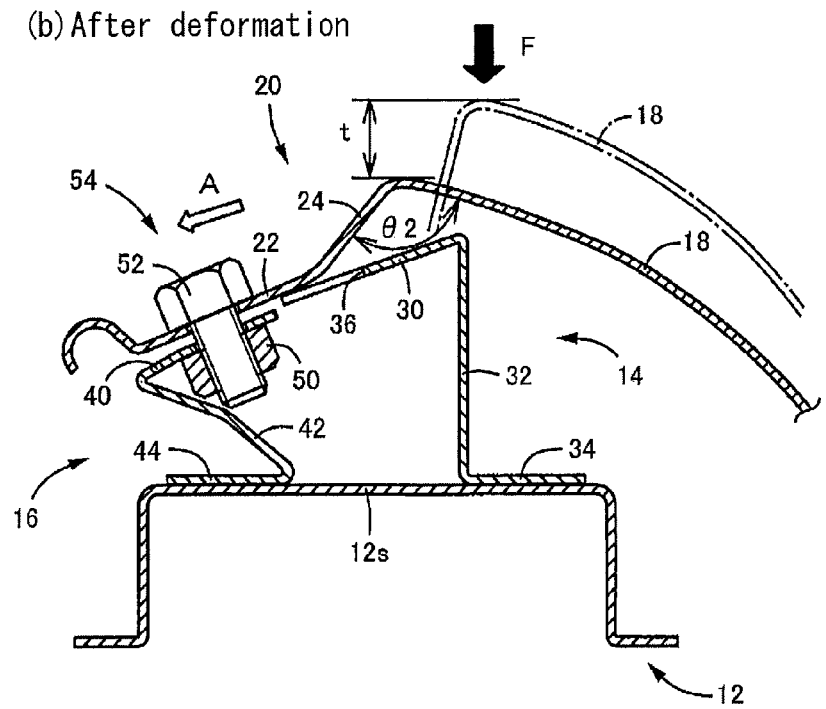

When a certain impact load is input from the fender panel 18 to the second upper wall 40, the second upper wall 40 together with the fender panel 18 is caused to be separated from the first upper wall 30 against the friction (or clamping force), traveling through the notch 36 toward the vehicle width center. The fender panel 18 includes the rising section 24 which extends obliquely upward as it separates away from the vehicle width center. Thus, when a downward impact load F is input to the rising section 24 as illustrated in FIG. 3(*b*), the attachment edge 22 receives a force directed toward the vehicle width center. The attachment edge 22 together with the second upper wall 40 is separated from the first upper wall 30, traveling toward the vehicle width center as indicated by the arrow A. A connector 54 comprises the bolt 52 and nut 50. The tightening force of the bolt 52 and nut 50 is predetermined as appropriate such that the first upper wall 30 and second upper wall 40 are coupled together with a certain clamping force and provide a desired support rigidity to support the fender panel 18 with, and such that when a certain impact load is input from the fender panel 18 to the second upper wall 40, the second upper wall 40 is displaced against the clamping force toward the vehicle width center and then separated from the first upper wall 30.

The attachment edge 22, the first upper wall 30, and the second upper wall 40 described above are each shaped in a flat plate, and are inclined downward as they near the vehicle width center. Therefore, when a downward impact load F is input to the rising section 24 as illustrated in FIG. 3(*b*) and the attachment edge 22 receives a force directed toward the vehicle width center, the attachment edge 22 and the second upper wall 40 are smoothly slid on the inclination toward the vehicle width center as indicated by the arrow A. In this way, the attachment edge 22 is lowered as well as traveling toward the vehicle width center. The amount of deformation (or vertical displacement of collapse) t of the fender panel 18 is thus increased to provide a better impact absorption. In particular, since the rising section 24 extends obliquely upward as it separates away from the vehicle width center, the rising section 24 is deformed to increase an opening angle of the upper portion 20 of the fender panel 18 along with the descent of the attachment edge 22. Thus, the opening angle q2 after the deformation is larger than the opening angle q1 before the deformation. Therefore, the amount of deformation t is further increased to provide a better impact absorption.

In the thus configured fender panel support structure 10, the first upper wall 30 and the second upper wall 40 are overlapped each other and connected together by the connector 54. Therefore, in the normal condition, the first bracket 14 and the second bracket 16 together provide a high support rigidity. When a certain impact load F is input, on the other hand, the second upper wall 40 is separated from the first upper wall 30, overcoming the clamping force of the connector 54. The fender panel 18 thus supported by only the second bracket 16 reduces the support rigidity and provides a better impact absorption corresponding to the deformation of the second bracket 16. In particular, the second bracket 16 is fixed to the upper member 12 in such an attitude that the second leg 42 extends in parallel with the vehicle length, and the second upper wall 40 extends away from the vehicle width center and is overlapped on the first upper wall 30. When an impact load is transferred from the fender panel 18 to the second upper wall 40, the second upper wall 40 together with the fender panel 18 is displaced toward the vehicle width center and then separated from the first upper wall 30. This can reliably provide the desired impact absorption when an impact load is applied to the fender panel 16, in all conditions irrespective of deformation of the hood 56.

In addition, both the first upper wall 30 and the second upper wall 40 are shaped in a flat plate, and are inclined downward as they near the vehicle width center. Therefore, when an impact load is input from the fender panel 18 to the second upper wall 40, the second upper wall 40 is smoothly slid on the inclination of the first upper wall 30 toward the vehicle width center. Consequently, this stably provides a desired impact absorption. In addition, the attachment edge 22 of the fender panel 18 is lowered as well as traveling toward the vehicle width center. Therefore, the amount of deformation t of the fender panel 18 itself is increased to obtain better impact absorption.

In addition, the first upper wall 30 defines the notch 36, the second upper wall 40 and the fender panel 18 define the connector holes 48 and 26, respectively, and the connector 54 comprises the bolt 52 inserted through the notch 36 and the connector holes 48 and 26 and the nut 50 screwed onto the bolt 52. When the bolt 52 and nut 50 are tightened each other with the fender panel 18, the first upper wall 30, and the second upper wall 40 interposed between the bolt 52 and nut 50, the first upper wall 30 and the second upper wall 40 are coupled together with a certain clamping force and provide a desired support rigidity to support the fender panel 18. In addition, when a certain impact load is input from the fender panel 18 via the bolt 52 to the second upper wall 40, the second upper wall 40 together with the fender panel 18 is displaced toward the vehicle width center with respect to the first upper wall 30 against the clamping force, with the bolt 52 traveling in the notch 36. The deformation of the second bracket 16 allows for the desired impact absorption. Thus, the clamping force can be easily adjusted by changing the tightening force of the bolt 52 and nut 50, and thereby the rigidity for supporting the fender panel 18, which corresponds to the clamping force, can be conveniently adjusted.

Moreover, the rising section 24 extends continuously from the attachment edge 22 of the fender panel 18. When a downward impact load F is input to the rising section 24, the attachment edge 22 receives a force directed toward the vehicle width center. Therefore, the second upper wall to which the attachment edge 22 is attached is smoothly displaced toward the vehicle width center, and desired impact absorption can be obtained stably. In addition, the rising section 24 is deformed such as to increase the opening angle of the upper portion 20 of the fender panel 18 and thus increase the deformation t of the fender panel 18 itself, resulting in a better impact absorption.

Furthermore, the second leg 42 includes as a deformable structure the bend 46 such that the second leg 42 is slanting toward the vehicle width center as it nears the top. Therefore, the second upper wall 40 to which the fender panel 18 is attached is smoothly displaced toward the vehicle width center through the deformation of the second leg 42, which assuredly allows for the desired impact absorption. In addition, the impact absorption by the deformation of the second leg 42 can be adjusted in accordance with the position or the bend angle of the bend 46.

Figure 7:
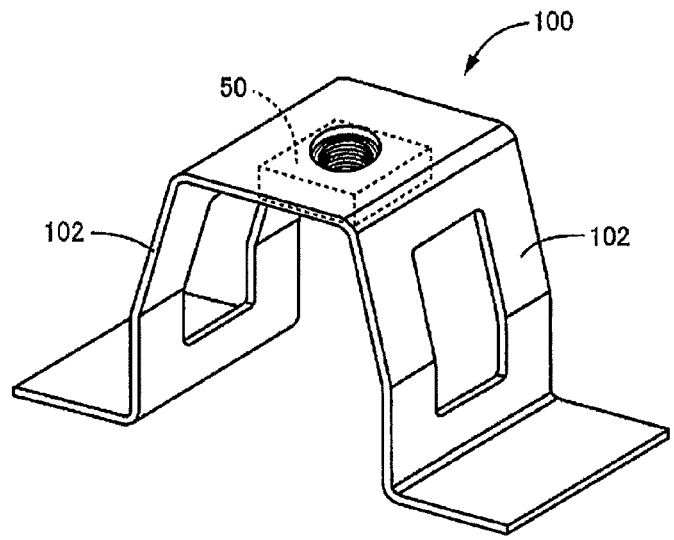
FIG. 7 is a perspective view illustrating an impact absorption bracket in a fender panel support structure according to the prior art.
Figure 8:
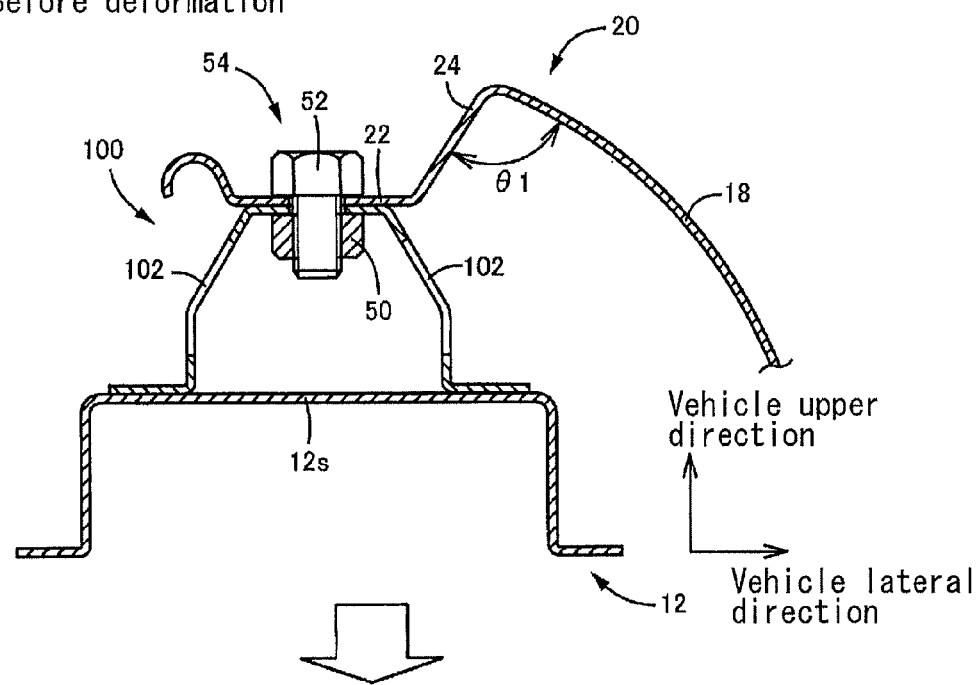
FIG. 8 illustrates operation that occurs when an impact load F is input to a fender panel support structure mainly constituted of the impact absorption bracket of FIG. 7, FIG. 8 being a vertical sectional view corresponding to FIG. 3.
Figure 8:
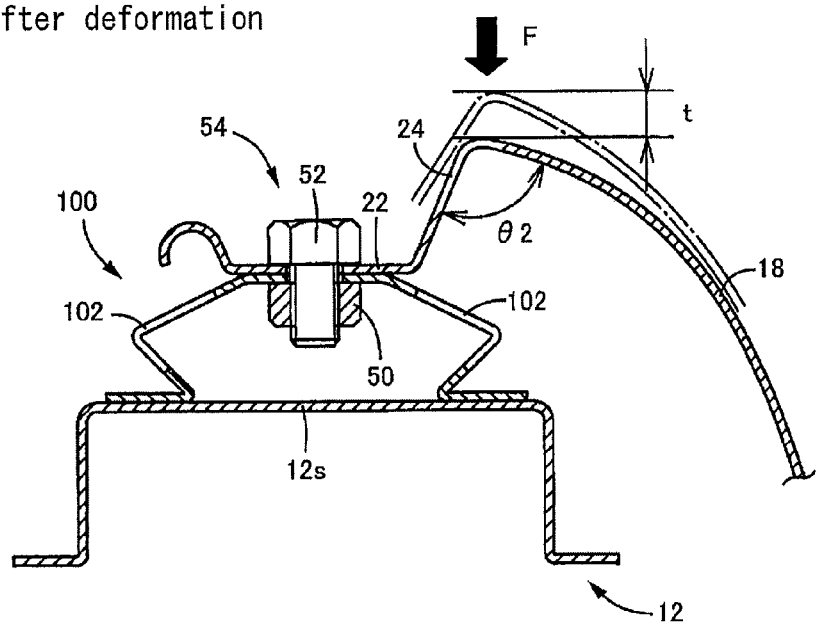

In contrast, in embodiments where the fender panel 18 is supported using an impact absorption bracket 100 comprising a single part including a pair of legs 102 that are laterally symmetric as illustrated in FIGS. 7 and 8(*a*), for example, the impact absorption bracket 100 is buckled generally vertically downward with the pair of legs 102 collapsed generally symmetrically when an impact load F is input to the rising section 24 as illustrated in FIG. 8(*b*). Therefore, the attachment edge 22 is only displaced generally vertically downward, and the opening angles q1 and q2 of the rising section 24 are generally the same as each other, and therefore the deformation t of the fender panel 18 itself is so small that sufficient impact absorption cannot be obtained. In addition, the impact absorption and the support rigidity are determined by the impact absorption bracket 100 alone, and therefore it is difficult to appropriately adjust such properties.

Other embodiments of the present invention will now be described. Portions of the following embodiments that are substantially the same as those of the embodiment described above are given the same reference numerals to omit detailed description.

Figure 4:
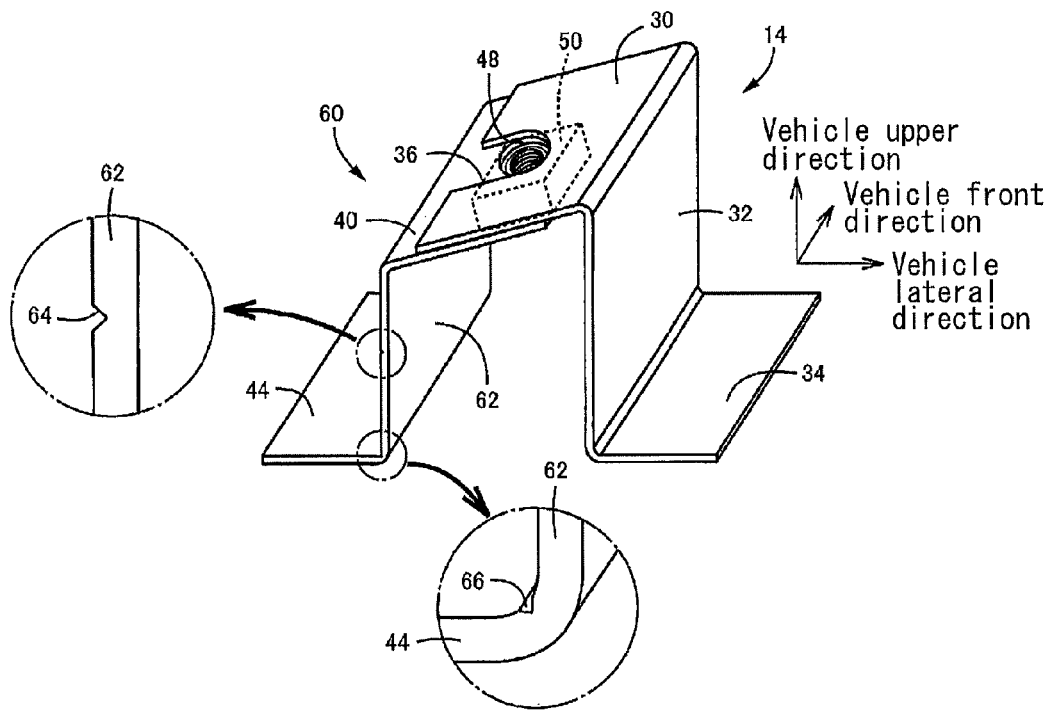
FIG. 4 illustrates another embodiment of the present invention, FIG. 4 being a perspective view of a pair of brackets corresponding to FIG. 2.

FIG. 4 differs from the embodiment described above in the second bracket 60. In the second bracket 60, a second leg 62 extending between the second upper wall 40 and the second flange 44 is shaped in a single flat plate that extends generally vertically, and includes a pair of grooves 64 and 66 that have a V-shaped section and that extend generally horizontally and parallel with the vehicle length as a deformable structure in place of the bend 46. The groove 64 is formed in a surface of the second leg 62 on the vehicle inner side at an intermediate position of the height. The groove 66 is formed in an inside surface of a bend between the second flange 44 and the second leg 62. The grooves 64 and 66 reduce the rigidity of the second leg 62, and allow the second upper wall 40 to be easily displaced toward the vehicle width center. The impact absorption by the deformation of the second leg 62 can be adjusted in accordance with the position, the depth, and the width of the grooves 64 and 66. The groove 64 may be formed in a surface of the second leg 62 on the vehicle outer side, and the groove 66 may be formed in an outside surface of the bend.

Figure 5:
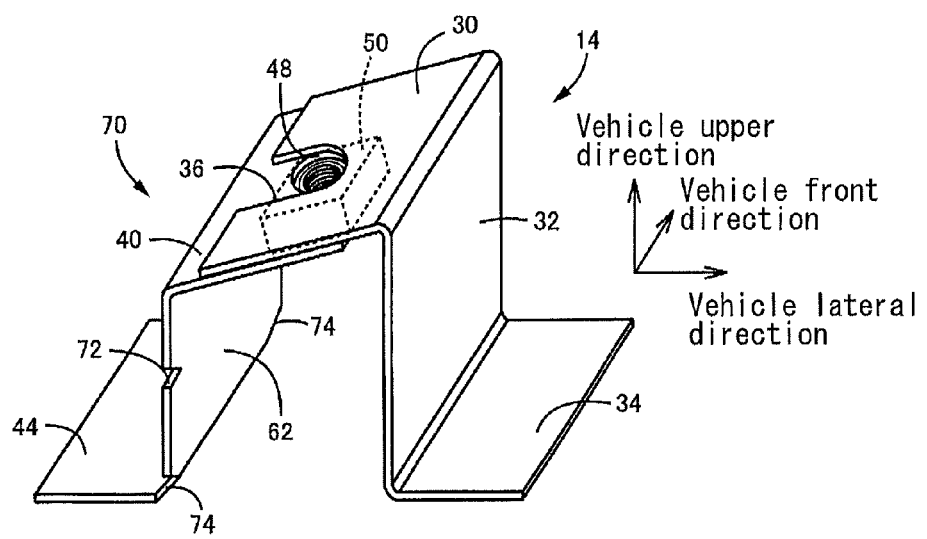
FIG. 5 illustrates still another embodiment of the present invention, FIG. 5 being a perspective view of a pair of brackets corresponding to FIG. 2.

FIG. 5 shows an embodiment in which a second bracket 70 includes V-shaped notches (or cuts) 72 and 74 at side end edges on both sides of the second leg 62 in place of the grooves 64 and 66 described above. This may have substantially the same function and effect as those of the embodiment shown in FIG. 4.

Figure 6:
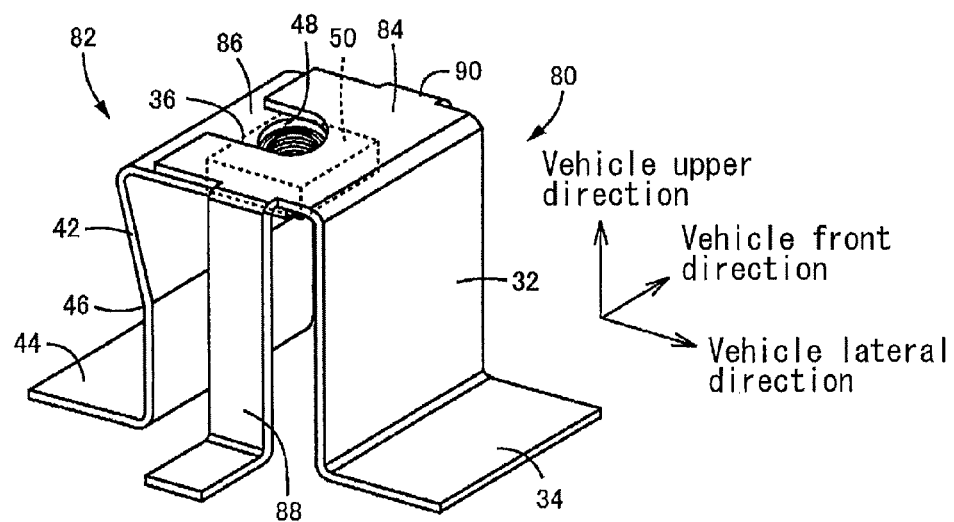
FIG. 6 illustrates still another embodiment of the present invention, FIG. 6 being a perspective view of a pair of brackets corresponding to FIG. 2.

A first bracket 80 and a second bracket 82 according to an embodiment of FIG. 6 differ from the first bracket 14 and the second bracket 16 of FIG. 2 in that a first upper wall 84 and a second upper wall 86 extend generally horizontally, and in that the first upper wall 84 is provided with a pair of auxiliary legs 88 and 90 in addition to the first leg 32. The auxiliary legs 88 and 90 function as the first leg, and are each fixed to the upper member 12 on a flange extending from each lower end. In addition, the attachment edge 22 of the fender panel 18 extends generally horizontally as shown in FIG. 8. The attachment edge 22 is laid on the upper surface of the first upper wall 84 so as to be in substantially close contact therewith and is coupled to the first upper wall 84 and the second upper wall 86 by the connector 54.

Also in the embodiment, the fender panel 18, the first upper wall 84, and the second upper wall 86 are fixedly coupled by the connector 54. Thus, the fender panel 18 is supported with desired support rigidity. In the embodiment, the first bracket 80 is provided with auxiliary legs 88 and 90. Therefore, high support rigidity can be secured easily. The auxiliary legs 88 and 90 may be included as necessary; they may be omitted. The first leg 32 may be omitted with the auxiliary legs 88 and 90 left included. Also for the first bracket 14 according to the embodiments described above, the auxiliary legs 88 and 90 can be employed in addition to or in place of the first leg 32.

When a certain downward impact load F is input to the rising section 24 of the fender panel 18, the attachment edge 22 is subjected to a stress directed toward the vehicle width center. Therefore, the second upper wall 86 to which the attachment edge 22 is attached is displaced against the clamping force of the connector 54 toward the vehicle width center and then separated from the first upper wall 84. This provides the desired impact absorption corresponding to the deformation of the second bracket 82 or the fender panel 18 itself, as described in the embodiments above.

While embodiments of the present invention have been described in detail above with reference to the drawings, such embodiments are exemplary, and the present invention can be implemented with a variety of modifications and alterations on the basis of the knowledge of a person skilled in the art.

DESCRIPTION OF REFERENCE NUMERALS

10 Fender panel support structure
12 Upper member (Vehicle body member)
14, 80 First bracket
16, 60, 70, 82 Second bracket
18 Fender panel
20 Upper portion
22 Attachment edge
24 Rising section
26 Connector hole
30, 84 First upper wall
32 First leg
34 First flange
36 Notch
40, 86 Second upper wall
42, 62 Second leg
44 Second flange
46 Bend (Deformable structure)
48 Connector hole
50 Nut
52 Bolt
54 Connector
64, 66 Groove (Deformable structure)
72, 74 Notch (Deformable structure)
88, 90 Auxiliary leg (First leg)
F Impact load

The invention claimed is:

1. A fender panel support structure for a vehicle, comprising:
   a first bracket including a first upper wall, a first leg extending downward from the first upper wall, and a first flange extending from a lower end of the first leg;
   a second bracket including a second upper wall overlapped on the first upper wall, a second leg extending downward from the second upper wall, and a second flange extending from a lower end of the second leg,
   wherein the first and second flanges are fixed to a vehicle body member, and an upper portion of a fender panel is connected to the second upper wall,
   wherein the second leg includes a deformable structure that deforms when an impact load is input from the fender panel to the second upper wall to cause the second upper wall together with the fender panel to be displaced generally horizontally; and
   a connector coupling the first and second upper walls together with a certain clamping force such that when a certain impact load is input from the fender panel to the second upper wall, the second upper wall is displaced against the clamping force until it is separated from the first upper wall.

2. The fender panel support structure for a vehicle according to claim 1, wherein the second leg of the second bracket extends transverse to a vehicle width, and the second upper wall of the second bracket extends away from the vehicle width center.

3. The fender panel support structure for a vehicle according to claim 1, wherein the second upper wall together with the fender panel is displaced toward the vehicle width center.

4. The fender panel support structure for a vehicle according to claim 1, wherein both the first and second upper walls are shaped in a flat plate and inclined downward as they near a vehicle width center so that the second upper wall is slid on the inclined first upper wall.

5. The fender panel support structure for a vehicle according to claim 1, wherein the first upper wall defines a notch extending from its edge on the near side from the vehicle width center, and the second upper wall and the fender panel each define a connector hole, and the connector comprising a bolt inserted through the notch and the connector holes, and a nut screwed onto the bolt, the bolt and the nut being tightened each other to couple the first and second upper walls together with a certain clamping force and fixedly attach the fender panel to the second upper wall, and the notch allowing the second upper wall to be displaced toward the vehicle width center until it is separated from the first upper wall.

6. The fender panel support structure for a vehicle according to claim 1, wherein the upper portion of the fender panel includes an attachment edge attached to the second upper wall, and a rising section extending obliquely upward from the attachment edge as it separates away from the vehicle width center so that the attachment edge receives a force directed toward the vehicle width center when a downward impact load is input to the rising section.

7. The fender panel support structure for a vehicle according to claim 1, wherein the deformable structure of the second leg is a bend located in a middle of the height of the second leg such that the second leg is slanting toward the vehicle width center as it nears the top.

* * * * *